United States Patent [19]

Nguyen et al.

[11] Patent Number: 4,949,348
[45] Date of Patent: Aug. 14, 1990

[54] BLUE-GREEN UPCONVERSION LASER

[75] Inventors: Dinh C. Nguyen; George E. Faulkner, both of Los Alamos, N. Mex.

[73] Assignee: The United States of america as represented by the Department of Energy, Washington, D.C.

[21] Appl. No.: 398,585

[22] Filed: Aug. 25, 1989

[51] Int. Cl.$^5$ ............................................. H01S 3/16
[52] U.S. Cl. ................................................... 372/41
[58] Field of Search .............................. 372/41, 70, 71

[56] References Cited

U.S. PATENT DOCUMENTS

| | | | |
|---|---|---|---|
| 4,054,852 | 10/1977 | Nicolai | 331/94.50 |
| 4,347,485 | 8/1982 | Esterowitz et al. | 372/42 |
| 4,386,428 | 5/1983 | Baer | 372/41 |
| 4,825,444 | 4/1989 | Johna et al. | 372/41 |

OTHER PUBLICATIONS

T. Y. Fan et al., "Diode Laser-Pumped Solid-State Lasers", 24 IEEE J. Quantum Electron., No. 6, pp. 895-947, (Jun. 1988).

A. J. Silversmith et al., "Green Infrared-Pumped Erbium Upconversion Laser," 51 Appl. Phys. Lett. No. 24, pp. 1977-1979.

H. Okuda et al., "Highly Reliable InGaP/InGaAlP Visible Light Emitting Inner Stripe Lasers with 667 nm Lasing Wavelength," 25 IEEE J. Quantum Electron., No. 6, pp. 1477-1482, (Jun. 1989).

Primary Examiner—William L. Sikes
Assistant Examiner—Robert E. Wise
Attorney, Agent, or Firm—Ray G. Wilson; Paul D. Gaetjens; William R. Moser

[57] ABSTRACT

A blue-green laser (450-550 nm) uses a host crystal doped with $Tm^{3+}$. The $Tm^+$ is excited through upconversion by a red pumping laser and an IR pumping laser to a state which transitions to a relatively lower energy level through emissions in the blue-green band, e.g., 450.20 nm at 75 K. The exciting laser may be tunable dye lasers or may be solid-state semiconductor laser, e.g., GaAlAs and InGaAlP.

6 Claims, 3 Drawing Sheets

BLUE-GREEN UPCONVERSION LASER

BACKGROUND OF INVENTION

This invention relates to solid-state lasers and, more particularly, to upconversion lasers for operating in the blue-green wavelength range. This invention is the result of a contract with the Department of Energy (Contract No. W-7405-ENG-36).

Blue-green lasers, i.e., lasers operating in the wavelength range of 450-550 nm, are needed for low loss transmission through ocean water. The short wavelength also has potential application to increasing the storage density of compact disks. However, present devices require complex activating lasers or fragile nonlinear frequency conversion.

Direct pumping of rare earth doped host materials has obtained blue-green lasing emission. U.S. Pat. No. 4,058,852, "Solid State Blue-Green Laser with High Efficiency Laser Pump," issued Oct. 18, 1977, to Nicolai teaches trivalent rare earth ions (e.g., Praseodymium ($Pr^{3+}$), Holium ($Ho^{3+}$)) doped in crystals (e.g., $YLiF_4$, $LaF_3$, $CaF_2$) and directly excited to a lasing state by an excimer laser. $Pr^{3+}$ and $Ho^{3+}$ in YLF are taught to lase at 479.3 and 491 nm, respectively, when pumped at 450 nm. U.S. Pat. No. 4,347,485, "Excimer-Pumped Blue-Green Laser," issued Aug. 31, 1982, to Esterowitz et al. teaches a sensitizer ion $Yb^{2+}$ doped in a host material with a trivalent rare earth activator ion (Pr, Tb, Dy, Ho, Er, Tm). The sensitizer ion is activated by a XeF laser at 352 nm and transfers energy to an activator ion for subsequent radiation in the blue-green range. In yet another approach, Tm doped in YLF has been directly excited by a UV source to produce lasing action at 453 nm.

Trivalent rare earth ions have also been excited to produce light at visible wavelengths using upconversion pumping schemes. In one approach, taught in A.J. Silversmith et al., "Green Infrared-Pumped Erbium Upconversion Laser," 51 Appl. Phys. Lett. No. 24, pp. 1977-1979 (Dec. 1987), $YAlO_3$ doped with $Er^{3+}$ is pumped at 792.1 nm and 839.8 nm to obtain laser action at 549.8 nm. $Er^{3+}$ is first excited from the $^4I_{15/2}$ state to the $^4I_{9/2}$ level, then excited to a state above the $^4S_{3/2}$ state, which relaxes to the $^4S_{3/2}$ state. Lasing action is then obtained through decay to the $^4I_{15/2}$ level, 218 $cm^{-1}$, emitting light at 549.8 nm. It is suggested that pumping might be achieved using a near-infrared GaAlAs semiconductor diode laser operating at the above wavelength.

It would be desirable to have a blue-green laser with solid state components. However, a lasing medium having excitation wavelengths compatible with solid-state laser output wavelengths has not been identified.

Accordingly, it is an object of the present invention to provide an upconversion laser medium for operating in the blue-green wavelength range.

Another object of the present invention is to provide a solid-state lasing medium having excitation levels effective for excitation by solid-state semiconductor diode lasers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF INVENTION

To achieve the foregoing and other objects, and in accordance with the purposes of the present invention, as embodied and broadly described herein, the apparatus of this invention may comprise a blue-green laser having a laser rod with a host material doped with $Tm^{3+}$. A first pumping laser excites the $Tm^{3+}$ from the ground state to a first state. A second pumping laser is then effective to excite the $Tm^{3+}$ from the first state to a second state for transition to a relatively low state at a wavelength in said blue-green range. The first and second pumping lasers are preferably solid-state semiconductor lasers.

In another characterization of the present invention, a method is provided for generating coherent blue-green light from a host material doped with $Tm^{3+}$. The $Tm^{3+}$ is irradiated at a first wavelength effective to excite the $Tm^{3+}$ to a first state and then irradiated at a second wavelength effective to excite the $Tm^{3+}$ from the first state to a second state effective to transition to a relatively low state at a wavelength in the blue-green range. In a preferred embodiment, the first and second wavelengths are available from solid-state semiconductor lasers.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE DRAWINGS

In accordance with the present invention, a novel upconversion lasing medium is provided that can be pumped at two wavelengths, one red and one near-infrared, to emit directly in the blue-green region (450-550 nm). In one embodiment, solid-state semiconductor lasers provide the required pumping wavelengths so that the entire laser may be formed of solid-state components. More particularly, it is taught, herein that $Tm^{3+}$ ions have excitation states that enable solid-state semiconductor pumping to result in an excited state that transitions to a lower state level at a frequency in the blue-green region.

Figure 1:
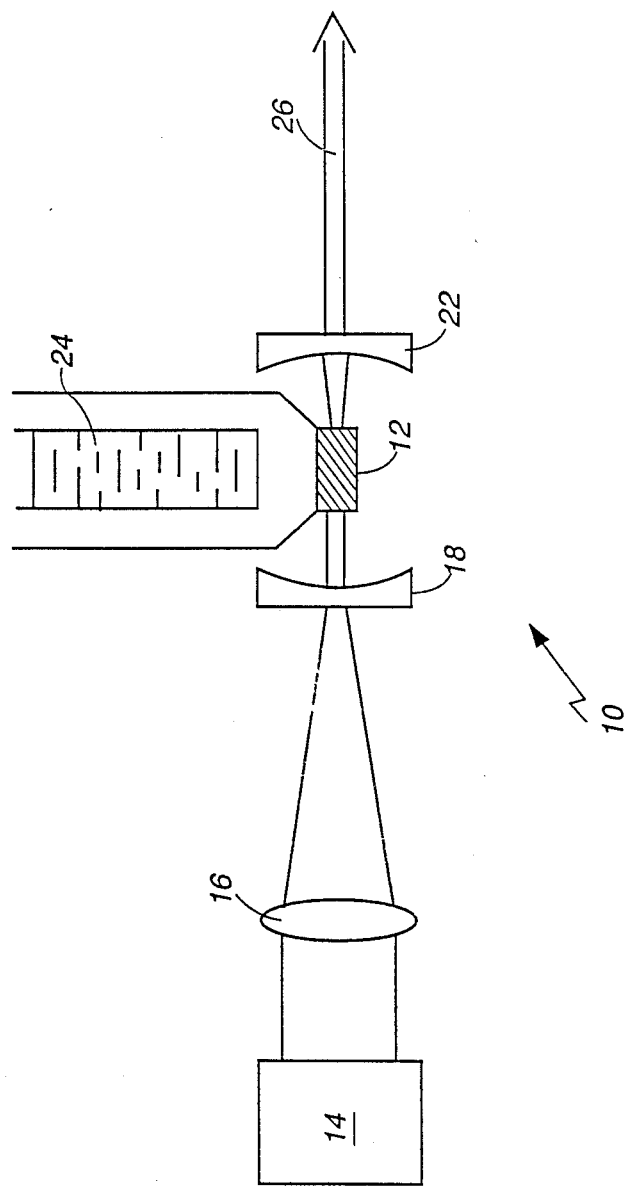
FIG. 1 is a schematic of one embodiment of a blue-green laser system according to the present invention.

Referring first to FIG. 1, there is shown a schematic of a blue-green laser system 10 according to one embodiment of the present invention. Laser rod 12 includes a host material, such as yttrium lithium fluoride (YLF), with a 1% doping of $Tm^{3+}$. Laser rod 12 is excited by laser system 14 containing lasers having wavelengths effective to excite the $Tm^{3+}$ to a state for blue-green lasing. As described below, one wavelength in the red and one wavelength in the near-infrared are required. Dye lasers have been used as pump sources since dye lasers are readily available with the desired wavelengths, but solid-state semiconductor lasers with the requisite wavelengths are also available.

Pumping light from lasers 14 is focused through lens 16, which may have a 250 mm focal length, through resonator mirror 18 into laser rod 12. Resonator mirror 18 has a 10 cm radius as herein described, is totally reflective at 450 nm, and is substantially transparent to exciting light from lasers 14. Thus, the mirror is reflective to light emitted from laser rod 12. Second resonator mirror 22 also has an exemplary radius of 10 cm and has a 90% reflectance at 450 nm to function as an outcoupling mirror for 10% of the incident radiation and is spaced about 12 cm from input mirror 18. In one embodiment, liquid nitrogen coolant 24 is provided to maintain laser rod 12 at about 75 K in order to increase $Tm^{3+}$ peak absorption and stimulated emission cross-sections so that efficient pumping can be achieved with narrow band dye lasers.

Figure 2:
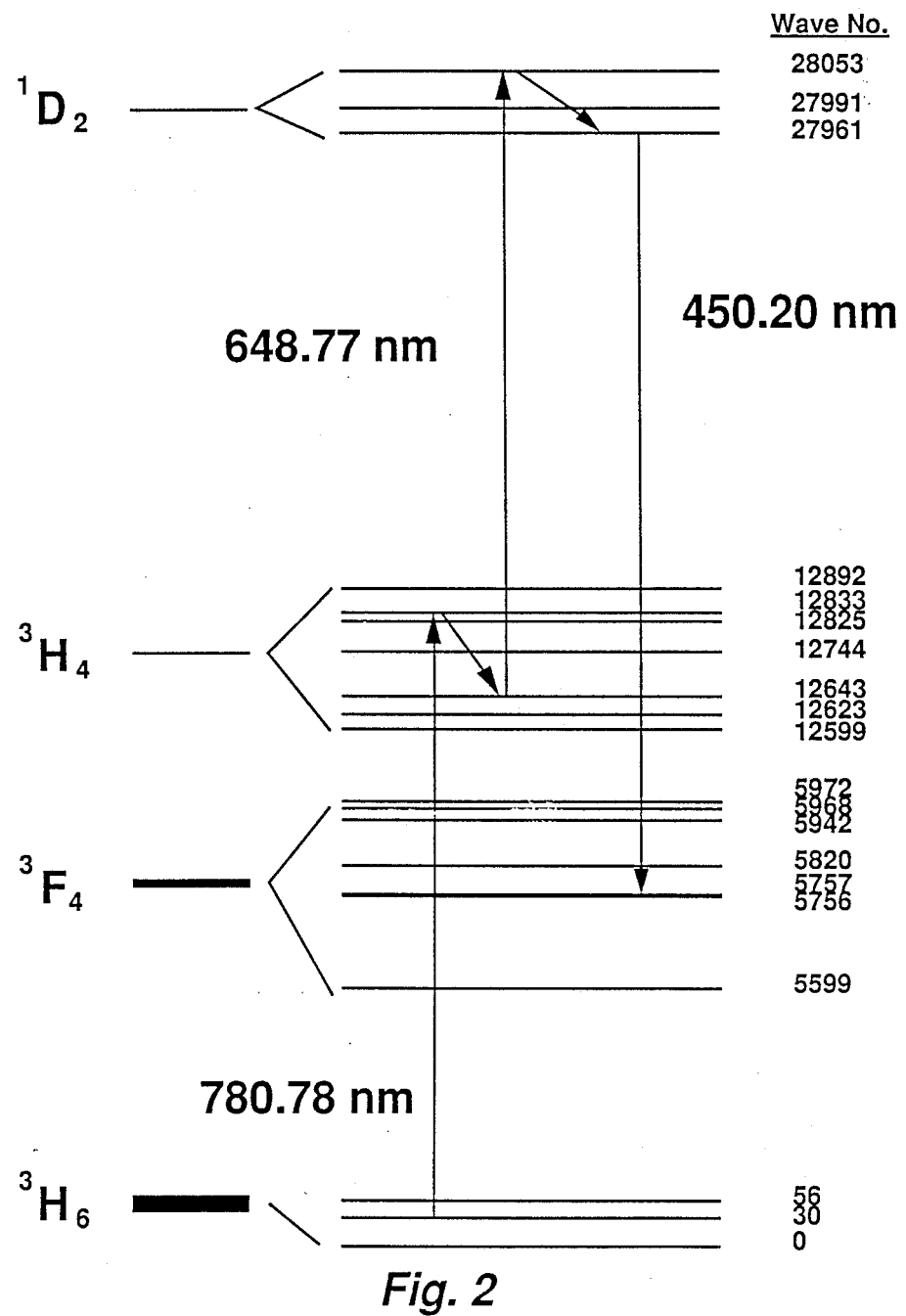
FIG. 2 is an excitation state diagram for $Tm^{3+}$.

Referring now to FIG. 2, there is shown a energy level diagram for $Tm^{3+}$. Under pi-polarized excitation at 780.78 nm, the $Tm^{3+}$ ion is excited from the $^3H_6$ ground state to the $^3H_4$ intermediate level. Following a rapid relaxation to the lower levels of the $^3H_4$ manifold, the ion is again excited to the $^1D_2$ upper laser level by a second laser, also pi-polarized, at 648.77 nm. At a 1% dopant, concentration and at 75 K, the $^1D_2$ upper laser level has a 50 microsecond lifetime. Most of the Tm ions in the $^1D_2$ level decay radiatively to the lowest excited energy level $^3F_4$, emitting intense blue-green fluorescence at around 450 nm. With the system shown in FIG. 1, an intense blue-green coherent light was emitted at a wavelength of 450.20 nm.

The initial performance of the system shown in FIG. 1 provided a 1.3% overall efficiency with unoptimized mode matching. Pump pulse energies of 10 mJ at 781 nm and 3.5 mJ at 649 nm produced an output energy of 0.180 mJ in a 10 ns pulse at 450.20 nm from a 1 cm long crystal. The laser threshold fluence for this unoptimized resonator, as measured at the center of laser rod 12 is 1 J/cm$^2$ for the 781 nm pump and 4 J/cm$^2$ for the 649 nm pump. At higher temperatures, the laser threshold increases and approaches the threshold of optical damage of YLF (about 10 J/cm$^2$) at 150 K. This optical damage threshold is, however, due to the artificially short 10 ns pulses used in the demonstration and should increase with pulse length. It should also be noted that the $^1D_2$ to $^3F_4$ transition is a self-terminating transition because the lower laser level lifetime of 12 ms is longer than the upper laser level lifetime so that a pulsed operation is required for this system.

Figure 3:
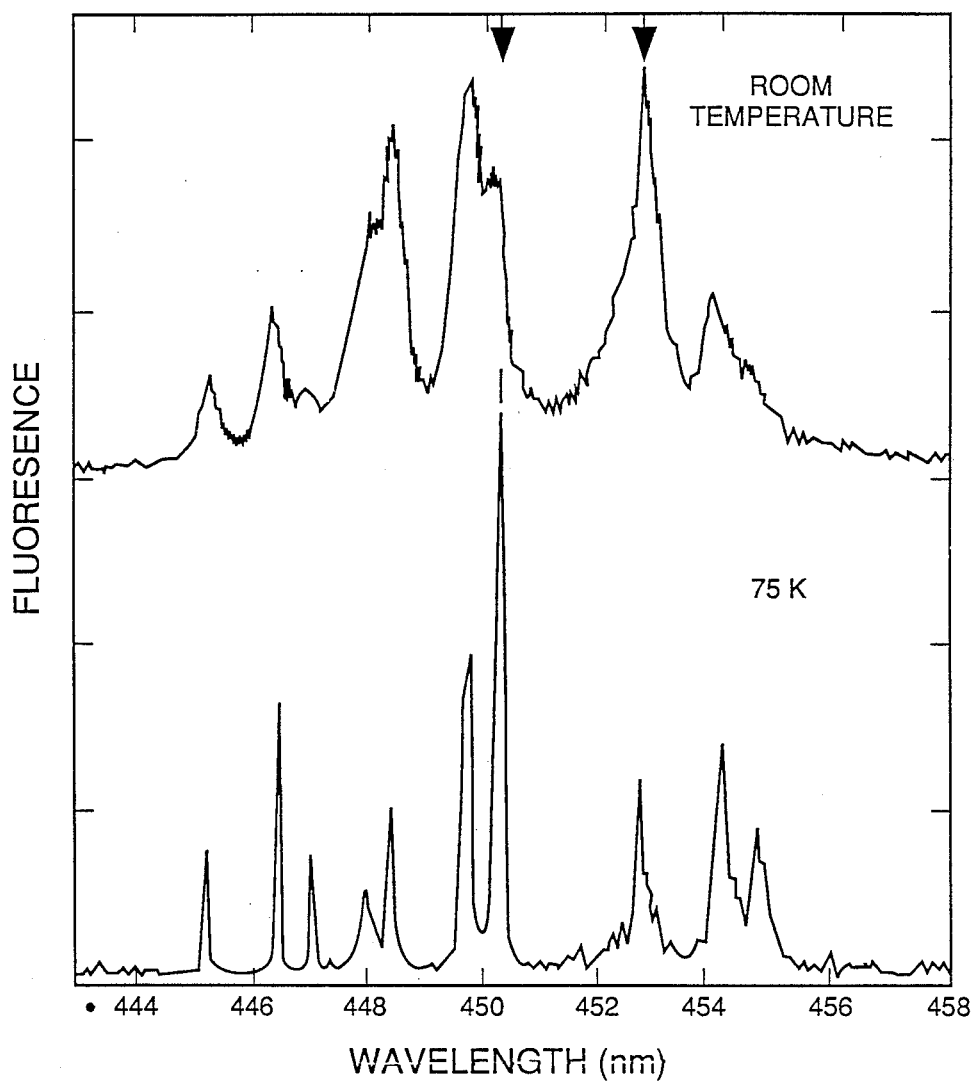
FIG. 3 is the fluorescence spectra for $Tm^{3+}$ at 75 K and at room temperature.

FIG. 3 graphically depicts the fluorescence spectra of $Tm^{3+}$ at 75 K and at room temperature. The large peak in spectra (b) at 75 K corresponds to the observed blue-green wavelength at 450.2 nm. Room temperature lasing is expected at the most intense transition line at 452.6 nm on the room temperature spectrum (a). A blue-green laser output at 452.6 nm corresponds to a transition from the same manifold levels as the 450.2 nm output, but it occurs from different levels within the $^1D_2$ and $^3F_4$ manifolds.

The absorption scheme herein described offers advantages over the direct UV pumping scheme for $Tm^{3+}$ described above. First, the pumping can be implemented with solid-state semiconductor lasers rather than dye laser or other complex chemical lasers. For example, GaAlAs laser diodes have an output at 781 nm and InGaAlP diodes have an output at 649 nm, corresponding to the upconversion wavelengths, for $Tm^{3+}$ herein taught. Secondly, the use of low energy red and infrared photons instead of high energy ultraviolet photons for pumping avoids problems associated with excited state absorption in the host conduction band where color centers would be created. It is also expected that with the appropriate choice of the pump laser bandwidths and pulse lengths, pumping efficiency can be increased to overcome the reduction in peak absorption and stimulated emission cross-section at higher temperatures.

Laser pumping with solid-state semiconductor lasers is generally discussed in Fan et al., "Diode Laser-Pumped Solid-State Lasers," 24 IEEE J. Quantum Electron., No. 6, pp. 895–912 (June 1988), incorporated herein by reference. A single step pumping of $Tm^{3+}$ by an IR laser is shown with possible emitting transitions at 1.5, 1.8, and 2.3 μm. However, no upconversion pumping is suggested.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A blue-green laser comprising:
   a. a laser rod having a host crystal doped with $Tm^{3+}$;
   b. a first pumping laser to excite said $Tm^{3+}$ from a ground state to a first excited in the $^3H_4$ manifold; and
   c. a second pumping laser effective to excite said $Tm^{3+}$ from said first state to a second excited state in the $^1D_2$ manifold for transition to a relatively low state in the $^3H_6$ manifold at a wavelength in said blue-green range.

2. A blue-green laser according to claim 1, wherein said first and second pumping lasers are dye lasers.

3. A blue-green laser according to claim 2, wherein said first pumping laser is at about 781 nm and said second pumping laser is at about 649 nm.

4. A blue-green laser according to claim 1, wherein said first pumping laser is a GaAlAs laser diode and said second pumping laser is an InGaAlP laser diode.

5. A method for generating coherent blue-green light from a host crystal doped with $Tm^{3+}$, including the steps of:
   a. irradiating said $Tm^{3+}$ at a first wavelength effective to excite said $Tm^{3+}$ to a first state in the $^3H_4$ manifold; and
   b. irradiating said $Tm^{3+}$ at a second wavelength effective to excite said $Tm^{3+}$ from said first state to a second state in the $^1D_2$ manifold effective to transition to a relatively low state in the $^3H_6$ manifold at a wavelength in said blue-green range.

6. A method according to claim 5, wherein said first wavelength is about 781 nm and said second wavelength is about 649 nm.

* * * * *